United States Patent [19]

Kazami et al.

[11] 4,441,774

[45] Apr. 10, 1984

[54] FLASH DEVICE OF A CAMERA

[75] Inventors: Kazuyuki Kazami, Tokyo; Yoshiaki Ohtsubo, Kawasaki, both of Japan

[73] Assignee: Nippon Kogaku K.K., Tokyo, Japan

[21] Appl. No.: 257,356

[22] Filed: Apr. 24, 1981

[30] Foreign Application Priority Data

| May 14, 1980 | [JP] | Japan | 55-62737 |
| May 15, 1980 | [JP] | Japan | 55-65580 |
| May 15, 1980 | [JP] | Japan | 55-65581 |
| May 16, 1980 | [JP] | Japan | 55-66202 |

[51] Int. Cl.³ .................................................. H05B 41/32
[52] U.S. Cl. .................................. 315/241 P; 315/225
[58] Field of Search ............... 315/241 P, 224, 225; 320/1; 363/19, 49

[56] References Cited

U.S. PATENT DOCUMENTS 4,323,822  4/1982  Takematsu ................ 315/241 P

FOREIGN PATENT DOCUMENTS 39-842  1/1964  Japan .

*Primary Examiner*—Eugene R. LaRoche
*Attorney, Agent, or Firm*—Fitzpatrick, Cella, Harper & Scinto

[57] ABSTRACT

A flash device for photography includes a DC/DC converter for boosting a DC power source voltage and applying a voltage to a main capacitor for supplying an energy for driving a flashlight tube. The converter has control means operative in response to the trigger operation by a start operating switch to detect any reduction in the charging current of the main capacitor and stop said operation. The flash device is provided with another switch means for enabling the operation of the converter independently of the start operating switch. Said another switch means is operative to operate the converter until the charging voltage of the main capacitor reaches a sufficient value to drive the flashlight tube.

10 Claims, 3 Drawing Figures

FLASH DEVICE OF A CAMERA

BACKGROUND OF THE INVENTION

1. Field of the Invention

This invention relates to a flash device operatively associated with a camera.

2. Description of the Prior Art

A flash device of the type in which a starting signal for a DC/DC converter is produced only for a moment in response to manual operation, whereby the DC/DC converter starts operating and charges a main capacitor and when the charging current thereof decreases to a predetermined value, the operation of the DC/DC converter is substantially stopped, is known from Japanese Patent Publication No. 842/1964. However, in order that the flash device of such type may actually be used without inconvenience, there are some problems left to be solved.

In the flash device of such type, there is a disadvantage that when the power supply battery is consumed and the voltage thereof drops, the operation of the DC/DC converter is stopped even if the main capacitor is charged only to a value lower than the charging completion voltage thereof. This is because the charging current of the main capacitor also decreases with a reduction in the power source voltage.

Also, where this flash device is contained in a camera and is designed such that the DC/DC converter is energized and operated only for a moment in response to an operation of preparation for flashlight photography, for example, the operation of retracting a cover member disposed in the front of the lens out of the phototaking light path or the projecting (pop-up) operation of a light emitting portion contained in the camera, whereby the main capacitor is charged, the charging of the main capacitor will not be effected unless these operations are repeated during each cycle of flashlight photography.

SUMMARY OF THE INVENTION

It is an object of the present invention to provide improvements in the flash device of the above-described type.

According to the present invention, there is provided a flash device in which the DC/DC converter can be forcibly operated until the main capacitor completes charging.

Also, according to the present invention, there is provided a flash device in which the operation for starting the DC/DC converter is simplified with a result that the quick photographing characteristic of flashlight photography is improved.

The invention will become more fully apparent from the following detailed description thereof taken in conjunction with the accompanying drawings.

DESCRIPTION OF THE PREFERRED EMBODIMENTS

Figure 1:
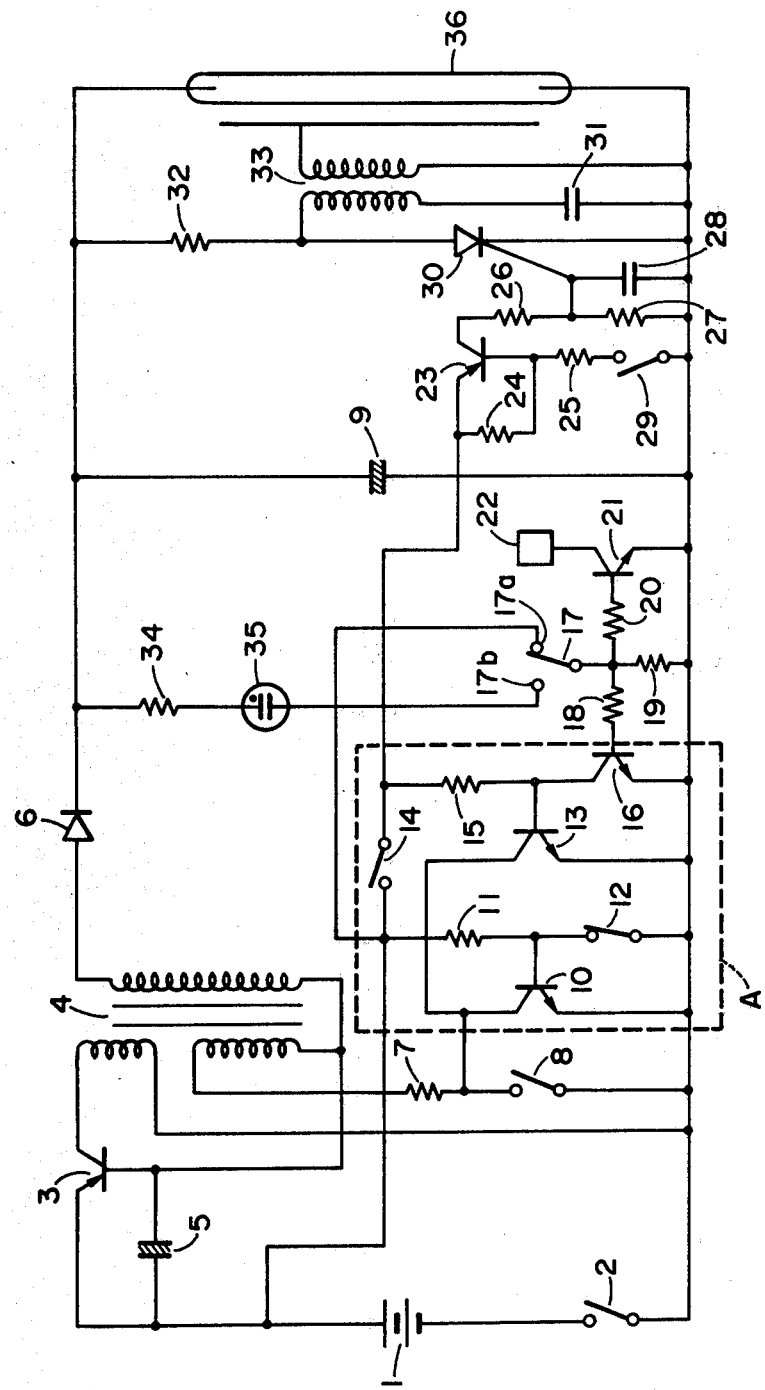
FIG. 1 is a circuit diagram showing an embodiment of the device according to the present invention.

In FIG. 1, a main switch 2 connected to a power supply battery 1 may be closed in response to the operation of a phototaking lens cover member uncovering the lens prior to photography. A transistor 3, a booster transformer 4, a capacitor 5, a rectifying diode 6 and a resistor 7 together constitute a DC/DC converter. A main starting switch 8 is a switch for initiating the oscillation of the DC/DC converter and may be momentarily closed during the operation for the preparation for flashlight photography and, in the present embodiment, it is designed to be closed in response to the uncovering operation of the cover member. The secondary winding of the booster transformer 4 is connected to the base (control electrode) of the transistor 3. The secondary output of the booster transformer 4 charges a main capacitor 9 through the diode 6.

An auxiliary starting transistor 10 is parallel-connected to the starting switch 8. The base of the transistor 10 is connected to the power supply battery 1 through a resistor 11, and a normally closed switch 12 controls the ON/OFF of the transistor 10. The switch 12 may be opened in response to the operation for the preparation for the next one frame photography after completion of one frame photography.

A transistor 13 is further parallel-connected to the switch 8. The base of the transistor 13 is connected to the power supply battery 1 through a switch 14 and a resistor 15. The switch 14 may be closed in response to the projection (pop-up) of a flashlight emitting portion from the camera body. A transistor 16 serves to control the ON/OFF of the transistor 13. When a change-over switch 17 selects a terminal 17a, the transistor 16 is normally turned on with the power source voltage divided by a resistor 19 being applied to the base thereof through a resistor 18, and when the change-over switch 17 selects a terminal 17b, the transistor 16 is turned on with a voltage produced in the resistor 19 by the turn-on current of a neon display tube 35 adapted to be turned on upon completion of the charging of the main capacitor 9 being applied to the base thereof through the resistor 18. This change-over switch 17 selects the terminal 17a when the flashlight emitting portion is contained in the camera body, and selects the terminal 17b in response, for example, to the projecting operation when the flashlight emitting portion is projected from the camera body.

If the neon display tube 35 is turned off when the change-over switch 17 selects the terminal 17b, a transistor 21 is turned off with the bias voltage by resistors 19, 20 cut off and produces a high level release lock signal at a terminal 22. When the neon display tube 35 is turned on or when the change-over switch 17 selects the terminal 17a, the transistor 21 is turned on and produces a low level release lock releasing signal at the terminal 22.

A transistor 23, resistors 24–27, a noise absorbing capacitor 28 and a synchro switch 29 operable in synchronism with the shutter release operation of the camera together constitute an auxiliary trigger circuit for a thyristor 30. A charge charged into a trigger capacitor 31 through a resistor 32 and a trigger transformer 33 may be discharged upon turn-on of the thyristor 30 to cause a flashlight discharge tube 36 to emit light.

Figure 2:
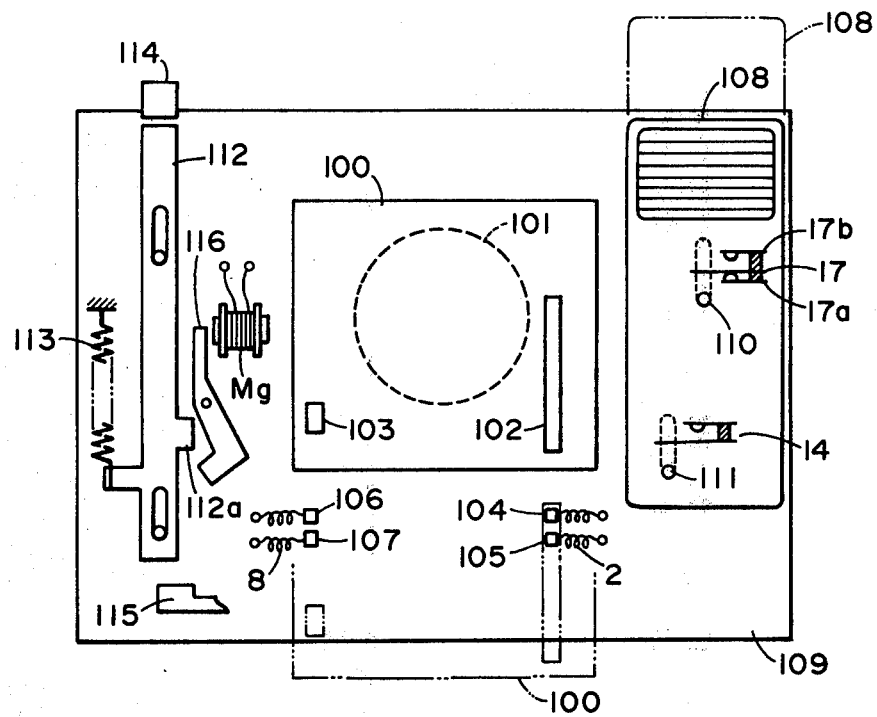
FIG. 2 is a schematic view of a camera containing therein the flash device of FIG. 1.

Referring now to FIG. 2, a cover member 100 is vertically slidable along the front face of a lens 101, and two conductors 102 and 103 are secured to the back side thereof which faces the camera body. When the cover member 100 is downwardly depressed prior to photography, the conductor 102 first connects terminals 104 and 105 to close the main switch 2. The conductor 102 is provided so that the switch 2 maintains its ON position even if the cover member 100 is moved to its lowermost position indicated by dots-and-dash line in which the cover member has been completely retracted from the front of the lens 101. The conductor 103 connects terminals 106 and 107 in the course of depression of the cover member 100 to momentarily close the switch 8.

A flashlight emitting portion 108 is vertically slidable relative to the camera body 109 along pins 110 and 111 fitted in grooves provided in the camera body. In the contained position of the flashlight emitting portion 108 shown in FIG. 2, the switch 14 is open and the change-over switch 17 selects the terminal 17a. When the flashlight emitting portion 108 is caused to project upwardly as indicated by dots-and-dash line, the change-over switch 17 selects the terminal 17b with the aid of the pin 110 and the switch 14 is closed by the pin 111.

A release lever 112 upwardly biased by a spring 113 is depressed against the force of the spring 113 by depression of a release button 114 and actuates a release plate 115. Shutter release is effected by the actuation of the release plate 115. A counter-clockwisely biased release lock member 116 is rotated clockwisely by energization of an electromagnet Mg and becomes be coupled to a projection 112a to restrain the release lever 112. By this, shutter release is hampered. The electromagent Mg is energized when the terminal 22 of FIG. 1 assumes a high level.

In the course of the operation of retracting the cover member 100 from the front of the lens, the switch 8 is momentarily closed to permit a current to flow to the resistor 7 to bias the base of the oscillating transistor 3. Thus, the oscillation by the oscillating transistor 3, the oscillating capacitor 5 and the booster transformer 4 is started. The secondary side voltage boosted by this oscillation charges the main capacitor 9 through the rectifying diode 6. This charging current is fed back to the primary side of the booster transformer 4 as the base current of the oscillating transistor 3, so that the oscillation persists even after the switch 8 has been opened. As the charging of the main capacitor 9 progresses and the charging current decreases, the base current of the oscillating transistor 3 decreases and therefore, the oscillating transistor 3 stops operating.

According to this construction and operation, charging is always started by the photography preparing operation of the camera, namely, the uncovering operation of the lens cover member and therefore, when the camera is changed over from photography not using the flash device to the condition using the flash device, the charging wait time is shortened to thereby provide a quick photographing characteristic. Also, the oscillation stops automatically and this greatly reduces the consumption of the battery caused by the photographer forgetting to open the main switch.

In the above-described construction, once the oscillation stops, it is not restarted except by closing the switch 8 again. Therefore, once flashlight is emitted for flashlight photography, reoscillation would not be started. This problem can be solved by the transistor 10 and the switch 12. That is, the normally closed switch 12 is opened in response to the operation of a shutter release mechanism or a film advance mechanism after flashlight photography has been terminated. The transistor 10 which remains in cut-off condition due to the closing of the switch 12 is biased and conducts by the power source 1 through the resistor 11 when the switch 12 is opened in response to the release of a shutter release button or to the operation at the initial stage of film advance, and starts the oscillation for boosting on behalf of the switch 8.

Also, according to the shown embodiment, even if the flashlight emitting portion 108 is contained and the switch 14 is open, the oscillation for boosting is restarted by shutter release operation of film advance operation, but if the biasing of the transistor 10, namely, the power supply to the resistor 11, is effected through the switch 14 adapted to be closed in response to the pop-up of the flashlight emitting portion, reoscillation of the DC/DC converter will occur only during the condition using the flash device.

In the above-described DC/DC converter whose oscillation is automatically stopped with a decrease in the charging current of the main capacitor 9, there is a possibility that as the power supply battery is consumed with a result that the power source voltage is reduced, the charging voltage which causes the oscillation of the main capacitor 9 to be stopped is reduced and at last, the boosting is stopped before the light emission capable voltage of the flashlight discharge tube 36 is reached. It is therefore necessary to forcibly cause the oscillation to persist until the light emission capable voltage is reached, and thereafter automatically stop the oscillation. The embodiment of FIG. 1 is designed such that such forcible oscillation is effected only during the pop-up of the flashlight emitting portion 108, namely, during the condition using the flash device, but of course, design may also be made such that the forcible oscillation is effected irrespective of the pop-up of the flashlight emitting portion 108.

The transistor 13 is used as the circuit accomplishing such forcible oscillation. When the flashlight emitting portion 108 is in its contained condition, the change-over switch 17 selects the terminal 17a. At this time, the resistor 19 is connected to the power supply battery 1, so that the transistor 16 is turned on with a result that the transistor 13 is turned off. Accordingly, when the flashlight emitting portion 108 is in its contained condition, the DC/DC converter is not forcibly oscillated.

Next, when the flashlight emitting portion 108 is projected, the change-over switch 17 selects the terminal 17b. By this, a charging completion indicating circuit including the resistor 34 and the neon display tube 35 is closed. Also, when the switch 14 is closed by the flashlight emitting portion 108 being projected, the base of the transistor 13 is connected to the power supply battery 1 through the resistor 15. When the charging of the main capacitor 9 has not yet been completed, the neon display tube 35 is not turned on and so, no current flows to the resistor 19. Accordingly, the transistor 16 is turned off with a result that the transistor 13 is turned on. The turn-on of the transistor 13, on behalf of the switch 8, causes the oscillation of the DC/DC converter to start.

When the charging of the main capacitor 9 is completed, the neon display tube 35 is turned on and the turn-on current thereof causes a voltage drop of the resistor 19 which is applied through the resistor 18 to the base of the transistor 16, which is thus turned on. Accordingly, the transistor 13 which has been ON until the neon display tube 35 is turned on is turned off and the DC/DC converter operates in a manner similar to that when the switch 8 has been opened. In this case, if the voltage of the power supply battery 1 is sufficient, the oscillation will persist for a predetermined time even if the neon display tube 35 is turned on and the transistor 13 turned off, whereafter the oscillation will be automatically stopped by a decrease in the feedback current to the transistor 3. Also, when the voltage of the power supply battery 1 has dropped, the oscillation is stopped at the same time that the transistor 13 is turned off or the neon display tube 35 is turned on.

A camera containing a flash device therein must be provided with a mechanism for locking shutter release during the oscillation of the DC/DC converter. The device according to the embodiment shown in FIG. 1 has a means for releasing the release lock by turn-on of the neon display tube 35, which means comprises the change-over switch 17, resistors 19, 20, transistor 21 and signal terminal 22. When the change-over switch 17 selects the terminal 17b, if the display tube 35 is turned on, the transistor 21 is turned on by a voltage produced in the resistor 19, through the resistor 20, and the signal terminal 22 assumes a low level and therefore, the magnet Mg of FIG. 2 is not energized and the releasing of the release lock can take place. Before the display tube 35 is turned on, the transistor 21 is turned off and the terminal 22 assumes a high level, so that the magnet Mg is energized to effect release lock. Also, when the flashlight emitting portion 108 is in its contained condition, the change-over switch 17 is connected to the terminal 17a. Since the voltage from the power source 1 is directly applied to the terminal 17a, the transistor 21 is always in its ON state, that is, the terminal 22 assumes a low level and the release lock is released.

The resistor 32, thyristor 30, trigger coil 33 and capacitor 31 together constitute a main trigger circuit for the flashlight discharge tube 36. By turn-on of the thyristor 30, the secondary side output of the trigger coil 33 is applied to the discharge tube 36 to cause light emission. An auxiliary trigger circuit for triggering the thyristor 30 is supplied with power from the primary side of the booster transformer through the switch 14. Therefore, the auxiliary trigger circuit operates only during pop-up of the flashlight emitting portion 108. When the synchro switch 29 is closed in synchronism with the opening of an aperture for exposure by the shutter, the transistor 23 is turned on through the resistor 25 and the divisional voltage of the resistors 26, 27 is applied to the gate of the thyristor 30, which is thus turned on to cause the flashlight discharge tube 36 to emit light. Resistor 24 is a leak cut resistor.

In the flash device wherein the oscillation of the DC/DC converter is automatically stopped in response to completion of the charging of the main capacitor 9, the charge stored in the main capacitor 9 is only decreased by leak after the oscillation has been stopped and therefore, it is necessary that, as far as possible, no load be connected to the secondary side of the booster transformer 4. For this reason, power is supplied to the auxiliary trigger circuit for the thyristor 30 from the primary side of the booster transformer.

Figure 3:
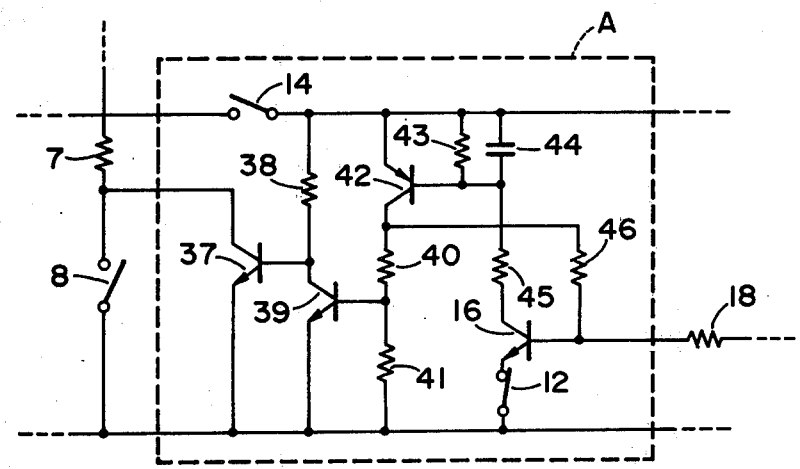
FIG. 3 is a circuit diagram showing another embodiment of the device according to the present invention.

FIG. 3 shows a second embodiment provided by changing the circuit block A of FIG. 1.

In the first embodiment, during pop-up of the flashlight emitting portion 108, the transistor 13 is turned off by turn-on of the display tube 35 to open the base circuit of the transistor 3 and automatically stop the oscillation of the DC/DC converter. In this case, the charge in the main capacitor 9 is consumed by the turn-on current of the display tube 35 and sooner or later, the charging voltage of the main capacitor 9 will become unable to maintain the display tube 35 turned on. Therefore, the display tube 35 will be turned off and the transistor 13 will be again turned on to restart the oscillation of the DC/DC converter. It is apparent that if such condition is repeated, the power source 1 will be consumed. The second embodiment shown in FIG. 3 improves this.

First, the switch 14 is closed by pop-up of the flashlight emitting portion 108. The switch 12 remains closed until the preparation operation for the next flashlight photography is started on the camera side. Transistor 37 is a transistor for forcible oscillation parallel-connected to the switch 8.

Now, when the change-over switch 17 selects the terminal 17b, the charging of the main capacitor 9 progresses and the display tube 35 is turned on, whereupon transistor 16 is turned on. Thereby, transistor 42 is turned on through a resistor 45, transistor 39 is turned on through a resistor 40, and transistor 37 is turned off. Accordingly, the oscillation of DC/DC converter is automatically stopped by completion of the charging. Next, when the display tube 35 is turned off, the transistor 16 maintains its ON state because it is biased through a resistor 46. That is, the present embodiment is one in which by making the transistors 16 and 42 into a bistable circuit, the base circuit of transistor 3 is opened at a stage whereat the display tube 35 has been turned on, and thereafter reoscillation does not occur even if the display tube 35 is turned off. The bistable circuit may also be achieved by the use of thyristors.

Switch 12, which operates in the same manner as that described in connection with FIG. 1, is used for releasing the latch of the bistable circuit. That is, when the switch 12 is opened and transistor 16 turned off in response to the preparation for the next flashlight photography, transistor 39 is turned off and transistor 37 is turned on through resistor 38, whereby oscillation is again started. Thus, the switch 12 also serves to restart the oscillation after flashlight emission, but in FIG. 3, the restarting of the oscillation is designed to take place only during pop-up the flashlight emitting portion.

In the foregoing embodiments, the switch 8 is momentarily closed in response to the retraction of the cover member 100 out of the phototaking light path of the lens, whereas this is not restrictive but the switch 8 may be closed in response to pop-up of the flashlight emitting portion 108.

What is claimed is:
1. In a flash device for photography including a DC/DC converter for boosting a DC power source voltage and applying a voltage to a main capacitor for supplying energy for driving a flashlight tube, said converter having control means operative in response to the trigger operation by a start operating switch to stop the operation when the charging current of said main capacitor is reduced at a predetermined current value, the improvement comprising:

another switch means for enabling the operation of said converter independently of said start operating switch, said another switch means being operative to operate said converter until the charging voltage of said main capacitor reaches a sufficient value to drive said flashlight tube; said another switch means including a switch circuit parallel-connected to said start operating switch, and a detecting circuit for detecting the charging voltage of said main capacitor and inverting the operation of said switch circuit.

2. In a flash device for photography including a DC/DC converter for boosting a DC power source voltage and applying a voltage to a main capacitor for supplying energy for driving a flashlight tube, said converter having control means operative in response to the trigger operation by a start operating switch to stop the operation when the charging current of said main capacitor is reduced at a predetermined current value, the improvement comprising:

another switch means for enabling the operation of said converter independently of said start operating switch, said another switch means being operative to operate said converter until the charging voltage of said main capacitor reaches a sufficient value to drive said flashlight tube; said another switch means including a switch circuit parallel-connected to said start operating switch, a detecting circuit for detecting the charging voltage of said main capacitor and producing a detection signal for inverting the operation of said switch circuit, and a holding circuit provided between said detecting circuit and said switch circuit to hold said detection signal.

3. In a flash device for photography including a DC/DC converter for boosting a DC power source voltage and applying a voltage to a main capacitor for supplying energy for driving a flashlight tube, said converter having control means operative in response to the trigger operation by a start operating switch to stop the operation when the charging current of said main capacitor is reduced at a predetermined current value, and said flash device being operatively associated with a camera by the light emitting portion thereof being disposed at a position on said camera suitable for flashlight photography, the improvement comprising:

another switch means for enabling the operation of said converter independently of said start operating switch, said another switch means being operative to operate said converter until the charging voltage of said main capacitor reaches a sufficient value to drive said flashlight tube; and means for hampering the operation of said converter by said another switch means when there is no operative association between said flash device and said camera.

4. A flash device for photography comprising:
(a) a DC power supply circuit for supplying a DC voltage;
(b) a trigger circuit including a flash tube and for triggering discharge of said flash tube;
(c) a charging circuit for storing an electric charge and supplying electrical energy to said flash tube;
(d) a DC/DC converter circuit for boosting said DC voltage from said DC power supply circuit and applying the boosted DC voltage to said charging circuit, said DC/DC converter circuit including an oscillating circuit which is connected with said DC power supply circuit and produces an alternating current flowing inside of said DC/DC converter;
(e) response means responding to the storing of said electric charge in said charging circuit and producing an output at a time when the storing of said electric charge reaches a sufficient value for the discharge of said flash tube; and
(f) means for controlling the operation of said oscillating circuit, the controlling means including a first control circuit for controlling said oscillating circuit in response to an electric current passing through said charging circuit during the storing of said electric charge, a second control circuit for controlling said oscillating circuit in response to the output of said response means and means for enabling selectively the control by said first control circuit and the control by said second control circuit.

5. The flash device according to claim 4, wherein said first control circuit drives said oscillating circuit for producing said alternating current until said electric current passing into said charging circuit is reduced at a predetermined current value, and said second control circuit drives said oscillating circuit for producing said alternating current until the output of said response means is produced.

6. The flash device according to claim 5, wherein said oscillating circuit includes a switch element having a control electrode and controlling the passing of said alternating current, said switch element being non-conductive when the electric current passing into said control electrode exceeds a threshold level, and wherein said first control circuit includes a circuit for connecting said charging circuit to said control electrode of said switch element.

7. The flash device according to claim 6, wherein said second control circuit includes a bypass circuit having another switch element and for flowing an electric current bypassed from said charging circuit into said control electrode, and a circuit for controlling said another switch element by the output of said response means.

8. The flash device according to claim 4, wherein said DC/DC converter circuit has a booster transformer and said trigger circuit includes a semiconductor switch element connected in parallel with said flash tube in relation to said charging circuit and an auxiliary trigger circuit connected to the primary side of said booster transformer for being supplied with power and operating said semiconductor switch element.

9. The flash device according to claim 8, wherein said trigger circuit further includes switch means connected between said booster transformer and said auxiliary trigger circuit for being operated to cut off the power supply from the primary side of said booster transformer.

10. The flash device according to claim 4, further comprises a signal generating circuit having an output terminal and a selector circuit for selectively connecting said signal generating circuit to said response means and to the primary side of said DC/DC converter circuit, said signal generating circuit generates a first signal to said output terminal when it is connected to said response means and when the storing of said electric charge is insufficient value for the discharge of said flash tube and generates a second signal to said output terminal when it is connected to the primary side of said DC/DC converter circuit and when the storing of said electric charge reaches said sufficient value.

* * * * *